(12) United States Patent
Saneyoshi et al.

(10) Patent No.: US 12,149,300 B2
(45) Date of Patent: Nov. 19, 2024

(54) INFORMATION PROCESSING DEVICE, INFORMATION PROCESSING SYSTEM, INFORMATION PROCESSING METHOD, AND PROGRAM

(71) Applicant: NEC Corporation, Tokyo (JP)

(72) Inventors: Eisuke Saneyoshi, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 52 days.

(21) Appl. No.: 18/011,290

(22) PCT Filed: Jun. 29, 2020

(86) PCT No.: PCT/JP2020/025459
§ 371 (c)(1),
(2) Date: Dec. 19, 2022

(87) PCT Pub. No.: WO2022/003757
PCT Pub. Date: Jan. 6, 2022

(65) Prior Publication Data
US 2023/0231595 A1 Jul. 20, 2023

(51) Int. Cl.
*H04B 3/46* (2015.01)
*H04H 60/32* (2008.01)

(52) U.S. Cl.
CPC .............. *H04B 3/46* (2013.01); *H04H 60/32* (2013.01)

(58) Field of Classification Search
CPC .......... H04B 3/46; H04H 60/32; H04H 60/31; H04H 60/29; H04H 20/12; H04H 20/14; H04H 60/09; H04H 60/00; H04H 20/65; H04H 20/71
See application file for complete search history.

(56) References Cited

U.S. PATENT DOCUMENTS

| | | | |
|---|---|---|---|
| RE37,991 E | * | 2/2003 | Legate ................... H04N 17/00 348/460 |
| 2007/0230542 A1 | | 10/2007 | Okada et al. |
| 2010/0248641 A1 | * | 9/2010 | Schumacher ...... H04B 17/0085 455/67.14 |
| 2016/0198152 A1 | * | 7/2016 | Chin ................... H04N 21/6143 725/107 |
| 2016/0302093 A1 | * | 10/2016 | Fuller ..................... H04H 20/12 |
| 2018/0063558 A1 | * | 3/2018 | Stefanidis ........ H04N 21/26258 |

FOREIGN PATENT DOCUMENTS

| | | |
|---|---|---|
| JP | S50-068602 A | 6/1975 |
| JP | 2003-188828 A | 7/2003 |
| JP | 2007-295538 A | 11/2007 |
| JP | 2008-271477 A | 11/2008 |
| WO | 2017/208446 A1 | 12/2017 |

OTHER PUBLICATIONS

International Search Report for PCT Application No. PCT/JP2020/025459, mailed on Sep. 29, 2020.

* cited by examiner

*Primary Examiner* — Khanh C Tran (57) ABSTRACT

An information processing device is configured to receive a test signal related to a content. Accordingly, the information processing device can discriminate the status of a transmission path based on the state of the received test signal.

9 Claims, 4 Drawing Sheets

| DATE TIME | CONTENT TYPE |
|---|---|
| 9:30 ON JUNE 1, 2020 | NEWS |
| 10:10 ON JUNE 1, 2020 | MUSIC SHOW |

INFORMATION PROCESSING DEVICE, INFORMATION PROCESSING SYSTEM, INFORMATION PROCESSING METHOD, AND PROGRAM

This application is a National Stage Entry of PCT/JP2020/025459 filed on Jun. 29, 2020, the contents of all of which are incorporated herein by reference, in their entirety.

TECHNICAL FIELD

The present invention relates to an information processing device, an information processing system, an information processing method, and a program.

BACKGROUND ART

Patent Document 1 discloses a technology for comparing two audio signals in full-wave rectification results with an operating amplifier and thereby indicating a discrimination therebetween based on magnitude of middle-frequency components upon suppressing low-frequency components and high-frequency components in differences between two audio signals.

CITATION LIST

Patent Literature Document

Patent Document 1: Japanese Patent Application Publication Number S50-068602

SUMMARY OF INVENTION

Technical Problem

Using the technology of Patent Document 1, it is possible to evaluate the status of transmission paths based on loudness of acoustic signals received through multiple transmission paths. However, the technology is designed to discriminate the status of transmission paths based on the already-received acoustic signals, in other words, it is not possible to discriminate the status of transmission paths in advance.

The present invention aims to provide an information processing device, an information processing system, an information processing method, and a program, which can solve the aforementioned problem.

Solution to Problem

According to the present invention, an information processing device includes a reception means configured to receive a test signal, which is set responsive to the type of a content scheduled to be broadcast or being broadcast, through at least one transmission path among a plurality of transmission paths, and an evaluation means configured to evaluate the status of at least one transmission path according to the state of the test signal received by the reception means.

According to the present invention, an information processing device includes a setting means configured to set a test signal responsive to the type of a content scheduled to be broadcast or being broadcast, and a second transmission means configured to transmit the test signal set by the setting means through at least one transmission path among a plurality of transmission paths.

According to the present invention, an information processing system includes a setting means configured to set a test signal responsive to the type of a content scheduled to be broadcast or being broadcast, a second transmission means configured to transmit the test signal set by the setting means through at least one transmission path among a plurality of transmission paths, a reception means configured to receive the test signal through at least one transmission path, and an evaluation means configured to evaluate the status of at least one transmission path based on the state of the test signal received by the reception means.

According to the present invention, an information processing method includes the steps of: receiving a test signal which is set responsive to the type of a content scheduled to be broadcast or being broadcast, and evaluating the status of at least transmission path based on the state of the received test signal.

According to the present invention, an information processing method includes the steps of: setting a test signal responsive to the type of a content scheduled to be broadcast or being broadcast, and transmitting the set test signal through at least one transmission path among a plurality of transmission paths.

According to the present invention, a program causes a computer of an information processing device, which is configured to receive a test signal to be set responsive to the type of a content scheduled to be broadcast or being broadcast through at least one transmission path among a plurality of transmission paths, to evaluate the status of at least one transmission path based on the received test signal.

According to the present invention, a program causes a computer to set a test signal responsive to the type of a content scheduled to be broadcast or being broadcast and to transmit the set test signal through at least one transmission path among a plurality of transmission paths.

Advantageous Effects of Invention

According to any one of the aforementioned aspects, it is possible to discriminate the status of transmission paths upon receiving test signals related to contents.

EXAMPLE EMBODIMENTS

First Exemplary Embodiment

Configuration of Information Processing System

Hereinafter, an information processing system 1 according to the first exemplary embodiment will be described in detail with reference to the drawings.

The information processing system 1 is designed to transmit contents produced by a performance facility 10 toward users to watch or listen to contents.

Figure 1:
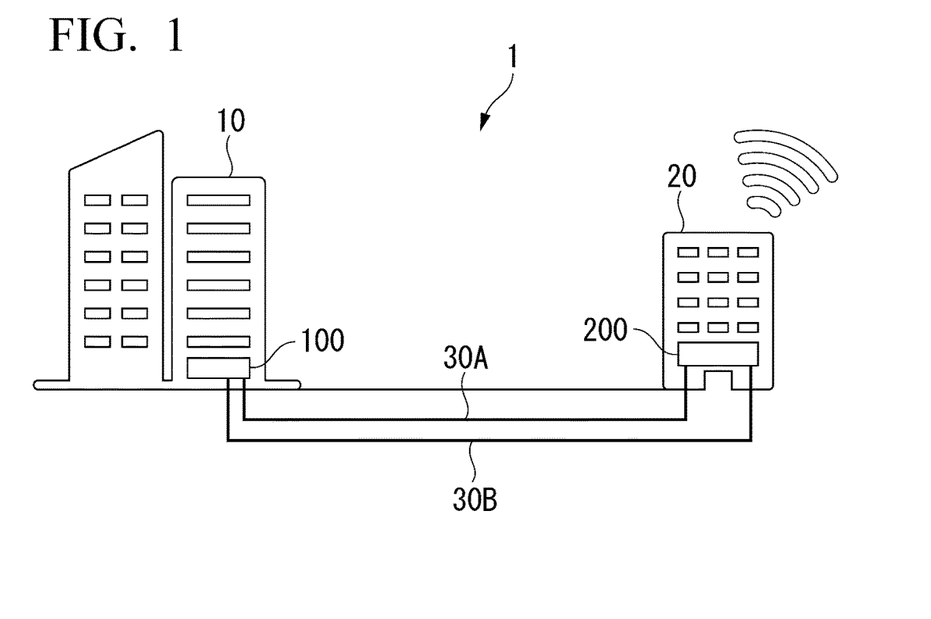
FIG. 1 is a schematic illustration showing the configuration of an information processing system according to one exemplary embodiment.

FIG. 1 is a schematic illustration showing the configuration of the information processing system 1 according to the first exemplary embodiment.

The information processing system 1 includes a performance system 100, a transmission system 200, and transmission paths 30. The performance system 100 is an example of an information processing system. The transmission system 200 is an example of an information processing system.

The performance facility 10 is designed to produce contents for broadcasting and telecommunication. As an example of the performance facility 100, it is possible to mention a place furnished with a performance room used to produce contents subjected to broadcasting by a broadcasting station. As an example of contents, it is possible to mention images and sounds. The details of contents will be described later. In this connection, images and sounds may include acoustic signals.

The performance facility 10 includes a master control device (not shown), a performance room (not shown), and performance equipment (not shown) as well as the performance system 100. The master control device is installed in a master control room provided inside the performance facility 10. The performance facility 10 may be provided in the master control room upon integrating the master control device and the performance system 100. The performance room is used to capture and record contents produced by the performance facility 10. The performance equipment is called a sub-control room to carry out operations for images and sounds related to contents produced by the performance facility 10. The detailed configuration of the performance system 100 will be described later.

The performance facility 10 is connectible to a plurality of transmission stations 20 through the transmission paths 30. FIG. 1 exemplarily shows one transmission station 20 among a plurality of transmission stations 20 connectible to the performance facility 10. In this connection, it is possible to provide a plurality of performance facilities 10. In this case, a plurality of performance facilities 10 is connectible to a plurality of transmission stations 20.

The transmission station 20 is a facility to transmit signals related to contents produced by the performance facility 10. As an example of the transmission station 20, it is possible to mention a parent station equipped with radio facilities (not shown) and relay stations. Radio facilities are electrical facilities to send or receive radio telegraphy, radio telephony, and other radio waves. The parent station is a key broadcasting station playing a central function among a plurality of transmission stations 20 connectible to the performance facility 10. Relay stations may refer to transmission stations 20 other than the parent station among a plurality of transmission stations 20 connectible to the performance facility 10. Compared with relay stations, the parent station is of a large scale including many facilities. In this connection, the transmission station 20 may be either a parent station or a relay station.

The transmission station 20 includes radio equipment and the transmission system 200. The detailed configuration of the transmission system 200 will be described later. A plurality of transmission stations 20 is connectible to the performance facility 10 through transmission paths 30. The transmission station 20 is connected to facilities or equipment owned by content users via radio equipment. In this connection, content users may be any person to watch or listen to contents produced by the performance facility 10

The performance facility 10 is designed to produce contents such as images or sounds. The transmission station 20 is designed to transmit contents using ultra high frequency (UHF), very high frequency (VHF), high frequency (HF), middle frequency (MF), or the like. For this reason, the transmission station 20 may be attached to a tower or the like installed on a mountain, providing capacity to transmit contents to a plurality of content users via radio equipment.

The transmission paths 30 can be each configured of any link such as a studio-to-transmitter link (STL) used to transmit contents produced by the performance facility 10 from the performance facility 10 to the transmission station 20. As examples of links, it is possible to mention optical cables, microwave lines, broad Ethernet lines, and the like. The optical cables are dedicated lines which should not be used for any usage other than transmission. The performance facility 10 is connected to the transmission station 20 through a plurality of transmission paths 30. Using a plurality of transmission paths 30, the information processing system 1 can secure transmission using another transmission path 30 irrespective of any failure occurring in any one of the transmission paths 30. FIG. 1 shows the information processing system 1 providing a transmission path 30A and a transmission path 30B. The performance system 100 is connected to the transmission system 200 through two transmission paths 30.

As exemplary types of contents to be produced by the performance facility 10, it is possible to mention news shows, talk shows, and music shows. Features distinct to types of contents will be described in detail below.

News shows would be constituted of voices to be recited by fixed tones such as calm tones. For this reason, this type of sounds has lower tone pitches than other types of sounds. That is, these types of sounds indicate a narrow range of audio frequency. In addition, these types of sounds have smaller variations of loudness than other types of sounds. That is, these types of sounds have smaller variations of audio amplitudes than other types of sounds. Moreover, these types of sounds may be characterized by voices of similar quality to last longer, and therefore these types of sounds have smaller variations of tone colors than other types of sounds. That is, these types of sounds have smaller variations of audio waveforms than other types of sounds.

Talk shows would be constituted of voices uttered by multiple persons. For this reason, the types of sounds have more frequent changes of tones than other types of sounds. These types of sounds have greater variations of loudness than other types of sounds. That is, these types of sounds have greater variations of audio amplitudes than other types of sounds. In addition, these types of sounds have greater variations of tone colors due to intonation or emotion than other types of sounds. That is, these types of sounds have greater variations of audio waveforms than other types of sounds. In addition, these types of sounds have higher tone pitches than news shows but lower tone pitches than music shows. For this reason, these types of sounds indicate a broader range of frequency than news shows but narrower range of frequency than music shows.

Music shows would be constituted of sounds produced by diverse musical instruments. For this reason, these types of sounds have higher tone pitches than other types of sounds. In addition, these types of sounds have greater variations of loudness than news shows but smaller variations of loudness than talk shows. That is, these types of sounds have greater variations of audio amplitudes but smaller variations of audio amplitudes than talk shows. Moreover, these types of sounds have greater variations of tone colors than other types of sounds. That is, these types of sounds have greater variations of audio waveforms than other types of sounds.

As described above, acoustic signals included in contents may have different feature quantity such as loudness, tone pitches, and tone colors for each type of contents.

In this connection, types of contents should not necessarily be limited to the aforementioned examples. Users of the information processing system 1 may classify acoustic signals of contents having different feature quantity into different types of contents. For example, users of the information processing system 1 may classify the aforementioned music shows into detailed types of contents. For example, users of the information processing system 1 may classify different sounds to be performed in music shows between human voices and sounds of musical instruments. In this case, users of the information processing system 1 may classify different types of music such as classics and contemporary music as different types of contents instead of music shows.

Configuration of Performance Facility

Hereinafter, the configuration of the performance system 100 will be described below.

The performance system 100 transmits contents and test signals related to contents to the transmission system 200.

Figure 2:
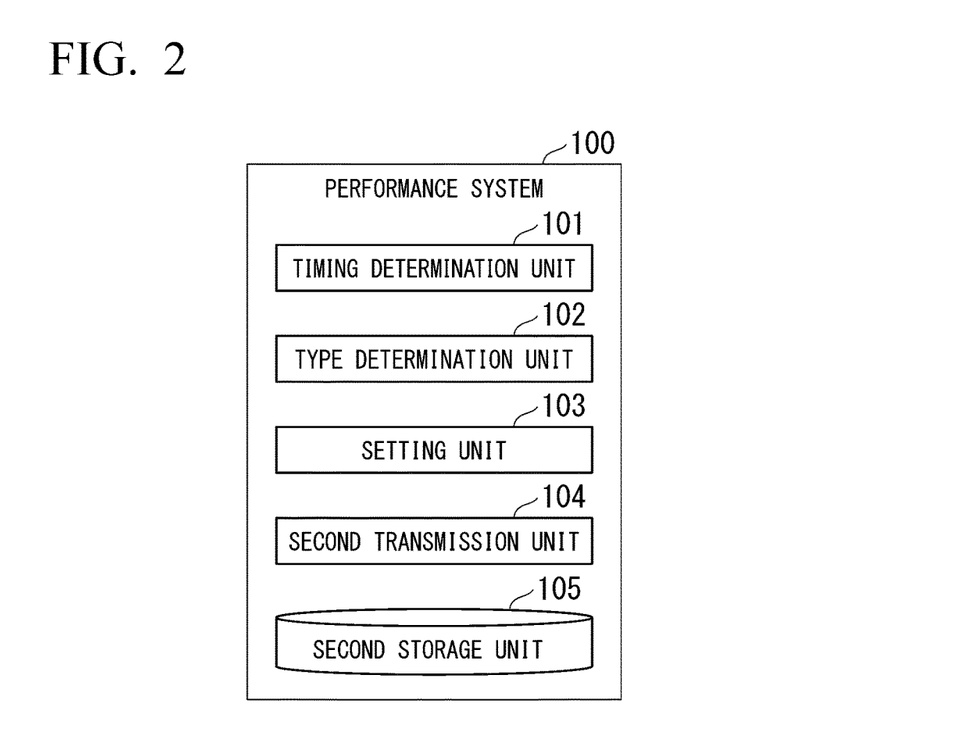
FIG. 2 is a block diagram showing the configuration of a performance system according to one exemplary embodiment.

FIG. 2 is a block diagram showing the configuration of the performance system 100. The performance system 100 includes a timing determination unit 101, a type determination unit 102, a setting unit 103, a second transmission unit 104, and a second storage unit 105

The timing determination unit 101 is configured to determine a timing at which the second transmission unit 104 transmits a test signal to the performance facility 20 based on the content information. The content information is information indicating a content type associated with a date/time. As examples of content information, it is possible to mention a program listing indicating a content scheduled to be broadcast associated with its date and time, information indicating types of contents associated with each other, and information indicating a type of content associated with its date and time.

For example, the timing determination unit 101 may determine the timing by subtracting a predetermined time from the date and time at which the broadcast-scheduled content may be changed. That is, the timing determination unit 101 determines the timing before broadcasting the broadcast-scheduled content. As an example of the predetermined time described above, it is possible to mention several minutes before broadcasting. Alternatively, the timing determination unit 101 may determine a preset time as the timing at which the second transmission unit 104 transmits a test signal to the transmission station 20. For example, the timing determination unit 101 may determine a time at which the performance facility 10 notifies a time signal as the timing at which the second transmission unit 104 transmits a test signal to the performance facility 20.

The timing determination unit 101 may determine the timing to be identical to a broadcasting time of contents when the broadcasting time of contents is greater than a predetermined threshold value. With respect to a content scheduled to be broadcast for two hours, the timing determination unit 101 may determine the timing as a time at which one hour has elapsed from the beginning of the content.

In this connection, the performance system 100 may be equipped with an input reception unit. In this case, the input reception unit is configured to receive the timing input by a user of the information processing system 1. In addition, the timing determination unit 101 determines the timing received by the input reception unit as the timing at which the second transmission unit 104 transmits a test signal to the transmission station 20.

Figure 3:
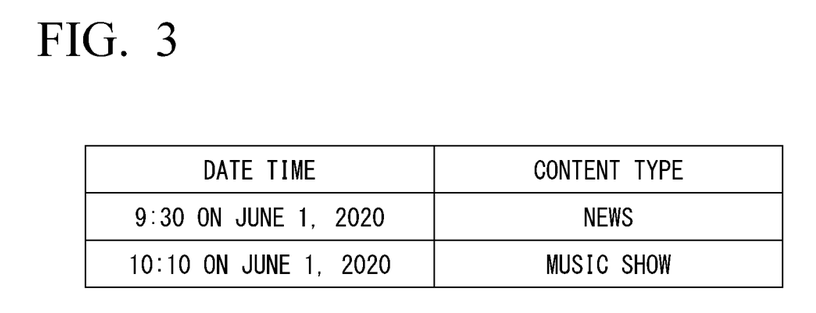
FIG. 3 is an example of a listing showing exemplary content information according to one exemplary embodiment.

FIG. 3 is an example of a listing showing exemplary content information. FIG. 3 shows 10:10 on Jun. 1, 2020 as the date and time at which the broadcast-scheduled content will be changed. For example, the timing determination unit 101 subtracts three minutes from the above date and time to produce 10:07 on Jun. 1, 2020 as the timing.

The type determination unit 102 is configured to determine a content type upon checking the future date and time subsequent to the timing determined by the timing determination unit 101 against the content information. In this connection, the type determination unit 102 is one example of a type determination means. For example, the type determination unit 102 checks the future date and time, which is produced by adding several minutes to the timing determined by the timing determination unit 101, against the content information to determine a content type.

In the case of the content information as shown in FIG. 3, the timing determination unit 101 determines the timing as 10:07 on Jun. 1, 2020. The type determination unit 102 adds three minutes to 10:07 on Jun. 1, 2020 to determine 10:10 on Jun. 1, 2020. Subsequently, the type determination unit 102 checks 10:10 on Jun. 1, 2020 against the content information to determine a content type as a music show.

In this connection, the performance system 100 can be equipped with an input reception unit configured to receive a content type input by a user of the information processing system 1. The type determination unit 102 may determine a content type as the content type received by the input reception unit.

The setting unit 103 checks the content type determined by the type determination unit 102 against signal information to set a test signal. The setting unit 103 is one example of a setting means. The signal information is information indicating an association between a content type and a test signal.

The test signal is an acoustic signal according to the type of a content scheduled to be broadcast or currently being broadcast. For example, a test signal is a signal related to feature quantity for each type of content.

As examples of signals related to feature quantity of contents, it is possible to mention signals produced by sampling signals representing feature quantity of content (hereinafter, referred to as sampling signals), signals capable of evaluating feature quantity of content (hereinafter, referred to as evaluation signals), signals produced by combining sampling signals and evaluation signals (hereinafter, referred to as composite signals), signals produced by processing any signals among sampling signals, evaluation signals, and composite signals, and the like. In the above, it is possible to mention a method of partially masking signals as an exemplary method for processing signals. As examples of evaluation signals, it is possible to mention audio signals, sweep tone signals, time-stretch pulses with frequency weights, and the like. As an exemplary length for a test signal, it is possible to mention several seconds.

As examples of feature quantity, it is possible to mention quantity of power components which can be produced by FFT (Fast Fourier Transform) analysis of acoustic signals of contents, quantity of time variances thereof, time series thereof, and the like. As a further example of feature quantity, it is possible to mention LPC coefficients which can be produced by LPC (Linear Predictive Coding) analysis of acoustic signals of contents as well.

The second transmission unit 104 is configured to transmit a test signal set by the setting unit 103 to the transmission station 20 through at least one transmission path 30 or more among a plurality of transmission paths 30. For example, the second transmission unit 104 transmits a test signal to the transmission system 200 through the transmission path 30A and the transmission path 30B.

In addition, the second transmission unit 104 is configured to transmit contents, which the performance facility 10 produces based on the broadcasting information, to the performance facility 10 through the transmission path(s) 30. The broadcasting information is information indicating contents associated with the date and time.

The second storage unit 105 is a device configured to store the signal information, the broadcasting information, and contents produced by the performance facility 10. As an example of the second storage unit 105, it is possible to mention a hard-disk drive (HDD). A user of the information processing system 1 may store on the second storage unit 105 the content information, the signal information, and the broadcasting information in advance. In this connection, the information processing system 1 may preclude the second storage unit 105 by using a cloud storage.

The information processing system 1 equipped with an input reception unit may further include an updating unit. In this case, the updating unit may update the content information or the signal information according to a user input to the information processing system 1 received by the input reception unit. As examples of updating operations, it is possible to mention deletion, addition, and modification.

According to the aforementioned operation of the performance system 100, contents produced by the performance facility 10 will be transmitted to the transmission station 20. Before contents are transmitted to the transmission station 20, the performance system 100 transmits a test signal related to contents to the transmission station 20. For this reason, before receiving contents, the transmission station 20 can evaluate the status of the transmission paths 30 according to the received test signal. The operation of the transmission station 20 to evaluate the transmission paths 30 will be described later.

Configuration of Transmission Station

The configuration of the transmission station 20 will be described below.

The transmission system 200 is configured to receive from the performance system 100 its contents and a test signal related to contents. In addition, the transmission system 200 transmits contents to external devices.

Figure 4:
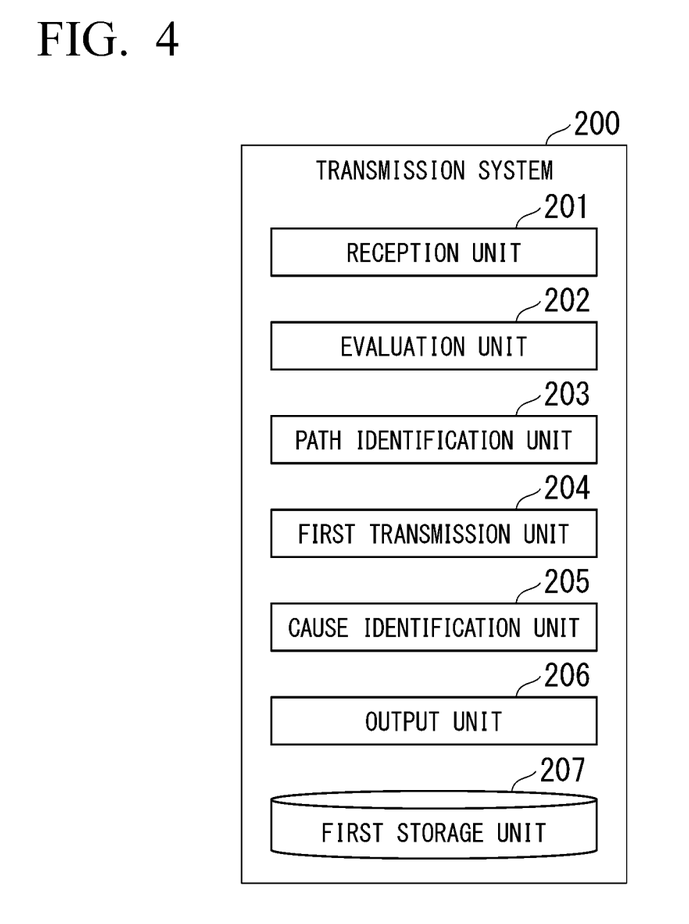
FIG. 4 is a block diagram showing the configuration of a transmission system according to one exemplary embodiment.

FIG. 4 is a block diagram showing the configuration of the transmission system 200. The transmission system 200 includes a reception unit 201, an evaluation unit 202, a path identification unit 203, a first transmission unit 204, a cause identification unit 205, an output unit 206, and a first storage unit 207.

The reception unit 201 is configured to receive a test signal through at least one transmission path 30 or more among a plurality of transmission paths 30. The reception unit 201 is an example of a reception means. For example, the reception unit 201 receives a test signal transmitted from the performance system 100 through the transmission path 30A and the transmission path 30B.

In addition, the reception unit 201 is configured to receive contents transmitted from the performance system 100 through the transmission path 30A and the transmission path 30B.

The evaluation unit 202 is configured to evaluate the status of at least one transmission path 30 or more based on at least one feature quantity or more among feature quantity related to tone pitches, feature quantity related to loudness, and feature quantity related to tone colors with respect the received test signal. The evaluation unit 202 is an example of an evaluation means.

As examples of feature quantity related to tone pitches and feature quantity related to loudness, it is possible to mention amounts of power components to be produced by FFT analysis. As an example of feature quantity related to tone colors, it is possible to mention LPC coefficients to be produced by LPC analysis.

An example of a concrete operation of the evaluation unit 202 will be described below.

A user may store on the first storage unit 207 feature quantity related to tone pitches, feature quantity related to loudness, and feature quantity related to tone colors with respect to a test signal for each content type. That is, the first storage unit 207 may store in advance an amount of power components for each frequency bin, which is obtained by FFE analysis of test signals, and LPC coefficients to be obtained by LPC analysis of test signals.

The evaluation unit 202 obtains an amount of power components for each frequency bin via FFT analysis of the received test signal. Subsequently, the evaluation unit 202 compares the obtained amount of power components (hereinafter, referred to as an amount of first components) for each frequency bin with an amount of power components (hereinafter, referred to as an amount of second components) for each frequency bin stored on the first storage unit 207.

When a difference between the total volume of first components and the total volume of second components for each frequency bin is equal to or above a preset threshold value, when a difference between a variation rate of first components over time and a variation rate of second components over time for each frequency bin is equal to or above a preset threshold value, or when a difference between a time series of first components and a time series of second components for each frequency bin is equal to or above a preset threshold value, the evaluation unit 202 may evaluate the transmission path 30 as a failed transmission path. Upon detecting a difference between the frequency indicating an amount of first components equal to or above the preset threshold value and the frequency indicating an amount of second components equal to or above the preset threshold value, the evaluation unit 202 evaluates the transmission path 30 as a failed transmission path.

According to the aforementioned operation, the evaluation unit 202 can evaluate the status of the transmission path 30 based on feature quantity related to tone pitches or feature quantity related to loudness with respect to the received test signal.

In addition, the evaluation unit 202 is configured to obtain LPC coefficients via LPC analysis of the received test signal. Subsequently, the evaluation unit 202 compares the obtained LPC coefficient (hereinafter, referred to as first coefficient) with the LPC coefficient stored on the first storage unit 207 (hereinafter, referred to as second coefficient). When a difference between the first coefficient and the second coefficient is equal to or above a preset threshold value, the evaluation unit 202 evaluates the transmission path 30 as a failed transmission path.

According to the aforementioned operation, the evaluation unit 202 can evaluate the status of the transmission path 30 based on feature quantity related to tone colors with respect to the received test signal.

A test signal transmitted through the transmission path 30 having a failure may be varied in feature quantity related to tone pitches, feature quantity related to loudness, or feature quantity related to tone colors. This is the reason why the aforementioned operation of the evaluation unit 202 can achieve evaluation as to a failure of the transmission path 30. In contrast, a test signal transmitted through the transmission path 30 having no failure may not be varied in feature quantity related to tone pitches, feature quantity related to loudness, or feature quantity related to tone colors.

In this connection, the evaluation unit 202 can adopt any method for evaluating the transmission path 30, which is not be necessarily limited to the aforementioned method.

It is not necessary for the evaluation unit 202 to concurrently evaluate the status of all the transmission paths 30. For example, the evaluation unit 202 may firstly evaluate the status of the transmission path 30A, and then upon evaluating the transmission path 30A as a failed transmission path, the evaluation unit 202 may further evaluate the status of the transmission path 30B.

The path identification unit 203 is configured to identify at least one transmission path 30 among a plurality of transmission paths 30 based on the content of evaluation of the evaluation unit 202. The path identification unit 203 is an example of a path identification means. An example of a detailed operation of the path identification unit 203 will be described below.

When the evaluation unit 202 evaluates the transmission path 30A as a non-failed transmission path, the path identification unit 203 is configured to identify the transmission path 30A. On the other hand, when the evaluation unit 202 evaluates the transmission path 30B as a non-failed transmission path, the path identification unit 203 is configured to identify the transmission path 30B.

In this connection, the path identification unit 203 can adopt any method for identifying the transmission path 30, which is not necessarily limited to the aforementioned method. For example, the path identification unit 203 may identify the transmission path 30 based on the status of all the transmission paths 30.

The transmission system 200 may be equipped with an input reception unit. When the evaluation unit 202 evaluates the transmission path 30 as a failed transmission path, for example, the output unit 206 outputs the content of evaluation to a display device (not shown) installed in the transmission system 200. The input reception unit receives the identity of the transmission path 30 input by a user of the information processing system 1. The path identification unit 203 identifies the transmission path 30 whose identity is received by the input reception unit.

The first transmission unit 204 is configured to transmit contents, which are received through the transmission path 30 identified by the path identification unit 203, to external devices. The first transmission unit 204 is an example of a first transmission means. When the path identification unit 203 identifies the transmission path 30A, for example, the first transmission unit 204 transmits contents, which are received through the transmission path 30A, to users to watch or listen to contents, via radio equipment installed in the transmission station 20. On the other hand, when the path identification unit 203 identifies the transmission path 30B, the first transmission unit 204 transmits contents, which are received through the transmission path 30B, to users to watch or listen to contents, via radio equipment installed in the transmission station 20.

The cause identification unit 205 is configured to identify a cause of failure of the transmission path 30 based on the evaluation content of the evaluation unit 202. The cause identification unit 205 is an example of a cause identification means. When the evaluation unit 202 evaluates the transmission path 30 as a failed transmission path, for example, the cause identification unit 205 checks the evaluation result of the evaluation unit 202 against the failure information to identify a failure. The failure information is information related to the evaluation result of the evaluation unit 202 associated with types of failure.

The output unit 206 is configured to output a cause identified by the cause identification unit 205 to a notification device installed in the transmission system 200. As examples of notification devices, it is possible to mention a display device, a speaker, and the like. The output unit 206 is an example of an output means.

The first storage unit 207 is configured to store the failure information and feature quantity of test signals for each content type. A user of the information processing system 1 may store on the first storage unit 207 the failure information and the feature quantity of test signals for each content type in advance.

Operation of Information Processing System

Hereinafter, the operation of the information processing system 1 will be described below.

Figure 5:
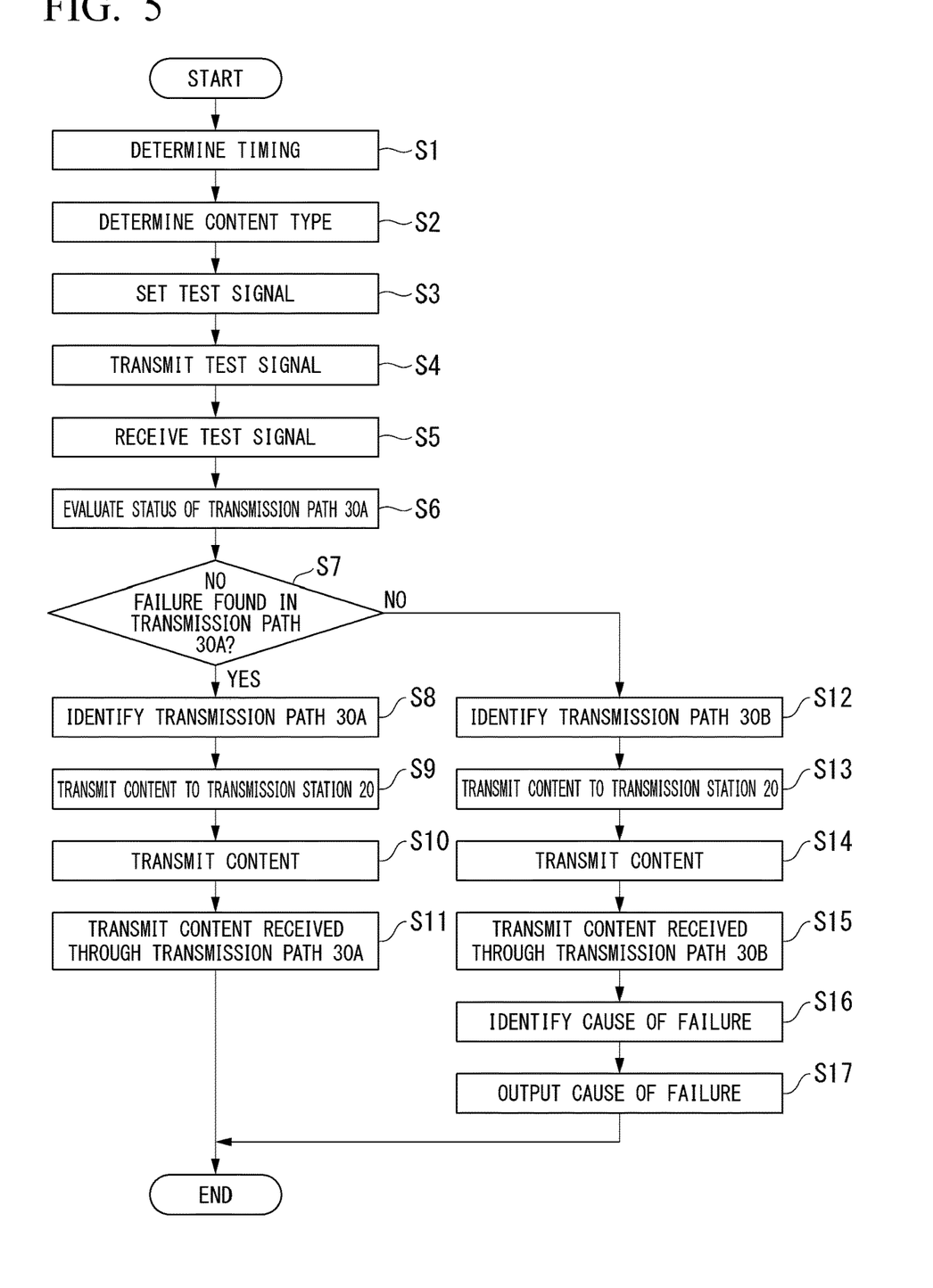
FIG. 5 is a flowchart showing the operation of the information processing system according to one exemplary embodiment.

FIG. 5 is a flowchart showing the operation of the information processing system 1. The following descriptions refer to the operation of the information processing system 1 related to the content information shown in FIG. 3.

Based on the content information, the timing identification unit 101 identifies the timing at which the second transmission unit 104 transmits a test signal to the transmission station 20 (step S1). For example, the timing identification unit 101 may identify the timing of 10:07 on Jun. 1, 2020 by subtracting a predetermined time from the time at which a news show is changed to a music show.

Using the timing identified in step S1, the type identification unit 102 checks the future date and time against the content information to identify a content type (step S2). For example, the type identification unit 102 adds a predetermined time to the timing identified in step S1 to identify the future date and time of 10:10 on Jun. 1, 2020. Subsequently, the type identification unit 102 checks 10:10 on Jun. 1, 2020 against the content information to identify a content type as a music show.

The setting unit 103 checks the content type identified in step S2 against the signal information to set a test signal (step S3). For example, the setting unit 103 may set a test signal associated with a music show.

The second transmission unit 104 transmits the test signal set in step S3 to the transmission station 20 through the transmission path 30A and the transmission path 30B (step S4). For example, the second transmission unit 104 transmits a test signal associated with a music show to the transmission system 200 through the transmission path 30A and the transmission path 30B.

The reception unit 201 receives the test signal transmitted in step S4 through the transmission path 30A and the transmission path 30B (step S5). For example, the reception unit 201 receives the test signal associated with the music show, which is transmitted by the performance system 100, through the transmission path 30A and the transmission path 30B.

The evaluation unit 202 evaluates the status of the transmission path 30A based on the state of the test signal received in step S5 (step S6). For example, the evaluation unit 202 compares an amount of first components, which is obtained from the test signal related to the music show received in step S5, with an amount of second components, thus evaluating as to whether or not the transmission path 30A has a failure. Alternatively, the evaluation unit 202 may compare a first coefficient, which is obtained from the test signal related to the music show received in step S5, with a second coefficient, thus evaluating as to whether or not the transmission path 30A has a failure.

In step S6, when the evaluation unit 202 evaluates the transmission path 30A as a non-failed transmission path (step S7: YES), the path identification unit 203 identifies the transmission path 30A (step S8).

When approximately three minutes have elapsed from the timing of step S8, the second transmission unit 104 transmits to the performance facility 10 through the transmission path 30A and the transmission path 30B the content related to the music show based on the broadcasting information (step S9).

The reception unit 201 receives the content related to the music show transmitted in step S9 through the transmission path 30A and the transmission path 30B (step S10).

The first transmission unit 204 transmits the content related to the music show, which is received through the transmission path 30A identified in step S8, to users to watch or listen to the content (step S11).

On the other hand, when the evaluation unit 202 evaluates the transmission path 30A as a failed transmission path in step S6 (step S7: NO), the path identification unit 203 identifies the transmission path 30B (step S12).

When approximately three minutes have elapsed from the timing of step S12, the second transmission unit 104 transmits to the performance facility 10 through the transmission path 30A and the transmission path 30B the content related to the music show based on the broadcasting information (step S13).

The reception unit 201 receives the content related to the music show transmitted in step S13 through the transmission path 30A and the transmission path 30B (step S14).

The first transmission unit 204 transmits the content related to the music show, which is received through the transmission path 30B identified in step S12, to users to watch or listen to the content (step S15).

The cause identification unit 205 identifies a cause of failure of the transmission path 30 based on the evaluation content of the evaluation unit 202 (step S16). For example, the cause identification unit 205 checks the evaluation result of step S6 against the failure information to identify a cause of failure.

The output unit 206 outputs the cause identified in step S16 to a display device installed in the transmission system 200 (step S17). The display device may display the cause of failure output from the output unit 206 for a user of the information processing system 1. This makes it possible for the user of the information processing system 1 to grasp the cause of failure in the transmission path 30.

As described before in conjunction with step S9 or step S13, the information processing system 1 is designed to transmit test signals related to contents as described in step S4 before transmitting contents. Upon receiving test signals, the transmission station 20 can discriminate the status of the transmission path 30 before transmitting contents. That is, the information processing system 1 is designed to discriminate the status of the transmission path 30 in advance. For this reason, it is possible for the information processing system 1 to prevent broadcasting accidents which may occur by transmitting contents received through the transmission path 30 having a failure to external devices.

Operation and Effect

An information processing device according to the present invention includes a reception means configured to receive a test signal set responsive to the type of a content scheduled to be broadcast or being broadcast through one or more transmission paths 30 among a plurality of transmission paths 30, and an evaluation means configured to evaluate the status of at least one transmission path 30 based on the state of the test signal received by the reception means.

The information processing device is configured to receive test signals related to contents. Accordingly, the information processing device can discriminate the status of the transmission path(s) 30 based on the states of the received test signals.

In addition, the evaluation means of the information processing device is configured to evaluate the status of at least one transmission path 30 based on the states of test signals set responsive to types of contents scheduled to be broadcast, which are received by the reception means.

Before receiving contents, the information processing device can receive test signals related to contents scheduled to be broadcast. Accordingly, the information processing device, before receiving contents, can discriminate the status of the transmission path(s) 30.

In addition, the information processing device may receive acoustic signals as test signals, whereby the evaluation means is configured to evaluate the status of at least one transmission path 30 according to at least one feature quantity among feature quantity related to tone pitches of test signals, feature quantity related to loudness of test signals, and feature quantity related to tone colors of test signals.

The information processing device can evaluate the status of the transmission path 30 according to feature quantity of tone pitches, feature quantity of loudness, or feature quantity of tone colors with respect to test signals received thereby.

In addition, the information processing device further includes a path identification means configured to identify at least one transmission path 30 among a plurality of transmission paths 30 according to the content of evaluation of the evaluation means.

The information processing device is configured to identify the transmission path 30 based on the status of the transmission path 30 evaluated by the evaluation means. Accordingly, the information processing device can identify the transmission path 30 having no failure.

In addition, the information processing device further includes a first transmission means configured to transmit contents, which are received through the transmission path 30 identified by the path identification means, to external devices.

The information processing device is configured to transmit contents, which are received through the transmission path 30 identified based on the status of the transmission path 30, to external devices. Accordingly, the information processing device can prevent broadcasting accidents when transmitting contents through the transmission path 30 having a failure in advance.

Moreover, the information processing device further includes a cause identification means configured to identify a cause of failure of the transmission path 30 based on the content of evaluation of the evaluation means, and an output means configured to output the cause of failure identified by the cause identification means.

The information processing device is configured to identify a cause of failure with respect to the transmission path 30 having a failure based on the content of evaluation of the evaluation means. This makes it possible for a user of the information processing device to grasp a cause of a failure which may occur in the transmission path 30.

According to the present invention, the information processing device includes a setting means configured to set a test signal for each type of a content scheduled to be broadcast or being broadcast, and a second transmission means configured to transmit the test signal set by the setting means through one or more transmission paths 30 among a plurality of transmission paths 30.

The information processing device is configured to transmit test signals set responsive to content types. This makes it possible for a user of the information processing device to evaluate the status of the transmission path 30 upon receiving test signals from the information processing device.

In addition, the information processing device further includes a second transmission means configured to transmit a test signal, which is set by the setting means in response to the next content scheduled to be broadcast, through at least one transmission path 30 among a plurality of transmission paths 30.

Before transmitting contents, the information processing device is configured to transmit test signals related to contents scheduled to be broadcast. This makes it possible for a user of the information processing device to evaluate the status of the transmission path(s) 30 according to test signals, which are received before receiving contents.

Moreover, the information processing device further includes a type identification means configured to identify a content type by checking the future date and time against the content information indicating the type of a content associated with the date and time, whereby the setting means can set a test signal by checking the content type identified by the type identification means against the signal information indicating the test signal associated with the content type.

The information processing device is configured to identify content types and to thereby transmit test signals associated with content types. This makes it possible for a user of the information processing device to evaluate the status of the transmission paths 30 according to test signals associated with content types.

According to the present embodiment, the information processing system 1 includes a setting means configured to set a test signal responsive to the type of a content scheduled to be broadcast or being broadcast, a second transmission means configured to transmit the test signal set by the setting means through at least one transmission path 30 among a plurality of transmission paths 30, a reception means configured to receive the test signal through at least one transmission path 30, and an evaluation means configured to evaluate the status of at least one transmission path 30 according to the state of the test signal received by the reception means.

The second transmission means of the information processing system 1 is configured to transmit a test signal set responsive to a content type. In addition, the reception means of the information processing system 1 is configured to receive the test signal. Accordingly, the information processing system 1 can evaluate the status of the transmission path(s) 30 according to the state of the received test signal.

According to the present invention, the information processing method includes steps of receiving a test signal, which is set responsive to the type of a content scheduled to be broadcast or being broadcast through at least one transmission path 30 among a plurality of transmission paths 30, and evaluating the status of at least one transmission path 30 according to the state of the received test signal.

According to the information processing method, it is possible for a user of the information processing method to receive test signals related to contents. This makes it possible for the user of the information processing method to evaluate the status of the transmission path(s) 30 according to states of test signals.

According to the present invention, the information processing method includes the steps of setting a test signal responsive to the type of a content scheduled to be broadcast or being broadcast, and transmitting the set test signal through at least one transmission path 30 among a plurality of transmission paths 30.

According to the information processing method, it is possible for a user of the information processing method to transmit test signals set responsive to content types. This makes it possible for the user of the information processing method to evaluate the status of the transmission paths 30 upon receiving test signals.

According to the present invention, a program causes a computer of an information processing device, which is configured to receive test signals set responsive to types of contents scheduled to be broadcast or being broadcast through at least one transmission path 30 among a plurality of transmission paths 30, to execute evaluation of the status of at least one transmission path 30 based on the received test signals.

According to the program, it is possible for a user of the program to receive test signals related to contents. This makes it possible for the user of the program to evaluate the status of the transmission path(s) 30 according to test signals.

According to the present invention, a program causes a computer to execute setting a test signal responsive to the type of a content scheduled to be broadcast or being broadcast and transmitting the set test signal through at least one transmission path 30 among a plurality of transmission paths 30.

According to the program, it is possible for a user of the program to transmit a test signal set responsive to a content type. This makes it possible for the user of the program to evaluate the status of the transmission path(s) 30 upon receiving the test signal.

Other Exemplary Embodiments

Heretofore, although the information processing system 1 according to one exemplary embodiment has been described in detail with reference to the drawings, concrete configurations should not be limited to the foregoing ones; hence, it is possible to adopt various design choices.

The evaluation unit 202 of the information processing system 1 may evaluate the status of the transmission path(s) 30 according to the aforementioned operations.

The evaluation unit 202 may evaluate as to whether or not any transmission path 30 has a failure by comparing a test signal (hereafter, referred to as a test signal A), which the reception unit 201 receives through the transmission path 30A, with another test signal (hereinafter, referred to a test signal B) which the reception unit 201 receives through the transmission path 30B.

For example, the evaluation unit 202 may evaluate the status of the transmission path(s) 30 according to a difference which is produced by comparing an amount of power components or LPC coefficient obtained from the test signal A with an amount of power components or LPC coefficient obtained from the test signal B.

In the above, the first storage unit 207 of the information processing system 1 may not necessarily store feature quantity of test signals.

According to the aforementioned operation, the information processing system 1 may evaluate the status of the transmission path(s) 30 based on feature quantity of the test signal A and feature quantity of the test signal B.

Basic Configuration

Hereinafter, the basic configuration of an information processing device will be described below.

Figure 6:
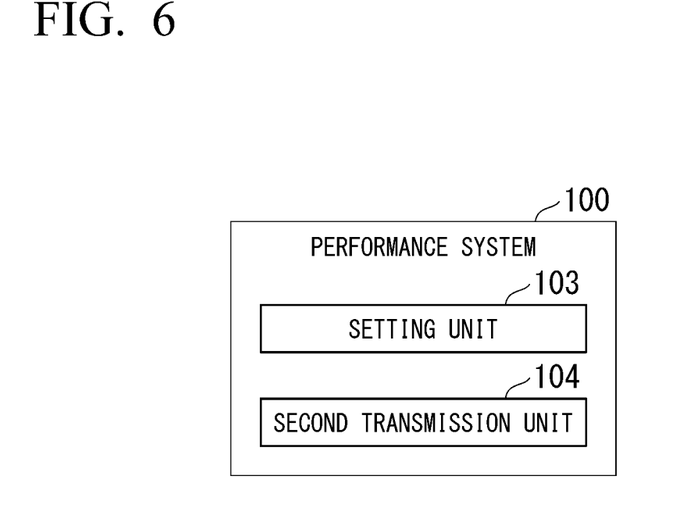
FIG. 6 is a block diagram showing the configuration of an information processing device according to its basic configuration.

FIG. 6 is a block diagram showing the basic configuration of the performance system 100 according to the present invention. The performance system 100 is an example of the information processing device.

The foregoing exemplary embodiments refer to the configuration shown in FIG. 2 as the performance system 100 according to one exemplary embodiment of the present invention, whereas the performance system 1 according to the present invention has the basic configuration shown in FIG. 6.

According to the present invention, the performance system 100 has the basic configuration including the setting unit 103 and the second transmission unit 104.

Configuration of Performance System

Hereinafter, the configuration of the performance system 100 having the basic configuration will be described below.

The setting unit 103 is configured to set a test signal by checking a content type against signal information. The setting unit 103 is an example of a setting means. The test signal is a signal responsive to the type of a content scheduled to be broadcast or being broadcast.

The second transmission unit 104 transmits the test signal set by the setting unit 103 to the transmission station 20 through at least one transmission path 30 among a plurality of transmission paths 30. For example, the second transmission station 104 is configured to transmit a test signal to the transmission system 200 through the transmission path 30A and the transmission path 30B.

Operation and Effect

An information processing device having a basic configuration includes a reception means configured to receive a test signal set responsive to the type of a content scheduled to be broadcast or being broadcast through at least one transmission path 30 among a plurality of transmission paths 30, and an evaluation means configured to evaluate the status of at least one transmission path 30 according to the state of the test signal received by the reception means.

The information processing device may receive test signals related to contents. Accordingly, the information processing device can evaluate the status of the transmission paths 30 according to the received test signals.

Computer Configuration

Figure 7:
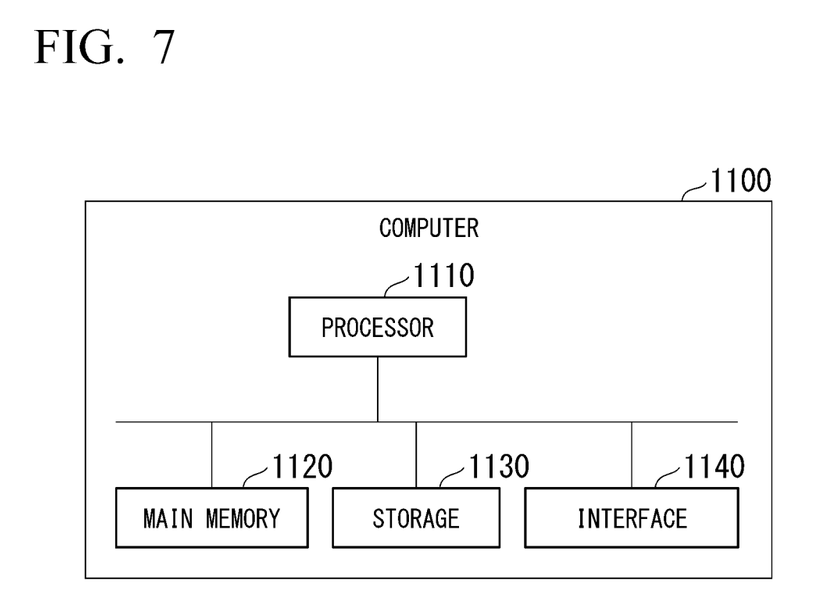
FIG. 7 is a block diagram showing the configuration of a computer according to any one exemplary embodiment.

FIG. 7 is a block diagram showing the configuration of a computer according to at least one exemplary embodiment.

A computer 1100 includes a processor 1110, a main memory 1120, a storage 1130, and an interface 1140.

The aforementioned performance system 100 and the transmission system 200 can be mounted on the computer 1100. The aforementioned operations of processing parts are stored on the storage 1130 in the form of programs. The processor 1110 reads programs from the storage 1130 to develop programs on the main memory 1120, thus executing the aforementioned processes according to programs. In addition, the processor 1110 secures storage areas corresponding to the aforementioned storage units on the main memory 1120 according to programs.

Programs may achieve some of the functionality to be implemented by the computer 1100. For example, programs may achieve the foregoing functionality when combined with other programs pre-stored on the storage 1130 or when combined with other programs implemented by other devices. According to other exemplary embodiments, the computer 110 may include a custom LSI (Large-Scale Integrated Circuit) such as a PLD (Programmable Logic Device) in addition to or instead of the aforementioned configuration. As examples of PLDs, it is possible to mention PAL (Programmable Array Logic), GAL (Generic Array Logic), CPLD (Complex Programmable Logic Device), and FPGA (Field-Programmable Gate Array). In this case, some or all of the functions realized by the processor 110 may be embodied on integrated circuits.

As examples of the storage 1130, it is possible to mention magnetic disks, magneto-optical disks, semiconductor memory, and the like. The storage 1130 may be internal media directly connected to buses of the computer 1100 or external media connected to a computer via the interface 1140 or through communication lines. When programs are delivered to the computer 1100 through communication lines, the computer 110 may develop programs delivered thereto on the main memory 1120 so as to execute the aforementioned processes. According to at least one exemplary embodiment, the storage 1130 may be non-transitory tangible storage media.

In addition, programs may embody some of the foregoing functions. Moreover, programs may be differential files (or differential programs) which can achieve the foregoing functions when combined with other programs pre-stored on the storage 1130.

Hereinafter, although the exemplary embodiments have been described in detail with reference to the drawings, concrete configurations should not be necessarily limited to the foregoing ones; hence, it is possible to employ various design changes. That is, it is possible to produce other exemplary embodiments by appropriately changing the order of the foregoing processes. Alternatively, it is possible to execute partial processes in parallel.

The performance system 100 and the transmission system 200 according to the aforementioned exemplary embodiments can be constituted of a single computer. Alternatively, the performance system 100 and the transmission system 200 may have individual configurations which can be separately deployed over a plurality of computers, which thus cooperate together to achieve the functions of the performance system 100 and the transmission system 200. At this time, one computer constituting the performance system 100 or the transmission system 200 may be installed inside a working machine while another computer may be provided externally of the working machine.

INDUSTRIAL APPLICABILITY

Information processing is designed to receive test signals related to contents. Accordingly, the information processing device can discriminate the status of transmission paths based on the state of the received test signals.

Some or all of the aforementioned exemplary embodiments can be described according to the following supplementary notes, however, these are not necessarily restrictions.

Supplementary Note 1

An information processing device includes a reception means configured to receive a test signal, which is set responsive to the type of a content scheduled to be broadcast or being broadcast, through at least one transmission path among a plurality of transmission paths, and an evaluation means configured to evaluate the status of at least one transmission path according to the state of the test signal received by the reception means.

Supplementary Note 2

The information processing device according to Supplementary Note 1, wherein the evaluation means is configured to evaluate the status of at least one transmission path according to the state of the test signal to be set responsive to the type of the next content scheduled to be broadcast, which is received by the reception means.

Supplementary Note 3

The information processing device according to Supplementary Note 1 or Supplementary Note 2, wherein the test signal is an acoustic signal, and wherein the evaluation means is configured to evaluate the status of at least one transmission path based on at least one feature quantity among feature quantity of the tone pitch of the test signal, feature quantity of the loudness of the test signal, and feature quantity of the tone color of the test signal.

Supplementary Note 4

The information processing device according to any one of Supplementary Note 1 through Supplementary Note 3, further including a path identification means configured to identify at least one transmission path among a plurality of transmission paths based on the content of evaluation of the evaluation means.

Supplementary Note 5

The information processing device according to Supplementary Note 4, further including a first transmission means configured to transmit to an external device the content which is received through the transmission path identified by the path identification means.

Supplementary Note 6

The information processing device according to any one of Supplementary Note 1 through Supplementary Note 5, further including a cause identification means configured to identify a cause of failure of the transmission path based on the content of evaluation of the evaluation mean, and an output means configured to output the cause of failure identified by the cause identification means.

Supplementary Note 7

An information processing device including a setting means configured to set a test signal responsive to a type of a content scheduled to be broadcast or being broadcast, and a second transmission means configured to transmit the test signal set by the setting means through at least one transmission path among a plurality of transmission paths.

Supplementary Note 8

The information processing device according to Supplementary Note 7, wherein the second transmission means is configured to transmit the test signal, which is set responsive to the next content scheduled to be broadcast and which is set by the setting means, through at least one transmission path among a plurality of transmission paths.

Supplementary Note 9

The information processing device according to Supplementary Note 7 or Supplementary Note 8, further including a type identification means configured to identify the content type by checking the future date and time against content information indicating the content type associated with its date and time, wherein the setting means is configured to set the test signal by checking the content type identified by the type identification means against the signal information indicating the content type associated with the test signal.

Supplementary Note 10

An information processing system including a setting means configured to set a test signal responsive to the type of a content scheduled to be broadcast or being broadcast, a second transmission means configured to transmit the test signal set by the setting means through at least one transmission path among a plurality of transmission paths, a reception means configured to receive the test signal through at least one transmission path, and an evaluation means configured to evaluate the status of at least one transmission path based on the state of the test signal received by the reception means.

Supplementary Note 11

An information processing method including the steps of: receiving a test signal which is set responsive to the type of a content scheduled to be broadcast or being broadcast, and evaluating the status of at least one transmission path based on the state of the received test signal.

Supplementary Note 12

An information processing method including the steps of: setting a test signal responsive to the type of a content scheduled to be broadcast or being broadcast, and transmitting the set test signal through at least one transmission path among a plurality of transmission paths.

Supplementary Note 13

A program causing a computer of an information processing device, which is configured to receive a test signal to be set responsive to the type of a content scheduled to be broadcast or being broadcast through at least one transmission path among a plurality of transmission paths, to evaluate the status of at least one transmission path based on the received test signal.

Supplementary Note 14

A program causing a computer to set a test signal responsive to the type of a content scheduled to be broadcast or being broadcast and to transmit the set test signal through at least one transmission path among a plurality of transmission paths.

REFERENCE SIGNS LIST 1 information processing system
10 performance facility
20 transmission station
30 transmission path
100 performance system
101 timing determination unit
102 type determination unit
103 setting unit
104 second transmission unit
105 second storage unit
200 transmission system
201 reception unit
202 evaluation unit
203 path identification unit
204 first transmission unit
205 cause identification unit
206 output unit
207 first storage unit
1100 computer
1110 processor
1120 main memory
1130 storage
1140 interface

The invention claimed is:

1. An information processing device comprising:
at least one memory storing instructions; and
at least one processor configured to execute the instructions to:
receive an acoustic test signal, which is set responsive to a type of content scheduled to be broadcast or that is being broadcast, through at least one transmission path among a plurality of transmission paths; and
evaluate a status of the at least one transmission path based on a state of the received acoustic test signal, and based on at least one feature quantity among a feature quantity of a tone pitch of the acoustic test signal, a feature quantity of loudness of the acoustic test signal, and a feature quantity of a tone color of the acoustic test signal.

2. The information processing device according to claim 1, wherein the at least one processor is configured to execute the instructions to evaluate the status of the at least one transmission path according to the state of the received acoustic test signal to be set responsive to a type of next content scheduled to be broadcast.

3. The information processing device according to claim 1, wherein the at least one processor is configured to execute the instructions to identify the at least one transmission path among the plurality of transmission paths based on content of evaluation of the status of the at least one transmission path.

4. The information processing device according to claim 3, wherein the at least one processor is configured to execute the instructions to transmit to an external device content which is received through the identified at least one transmission path.

5. The information processing device according to claim 1, wherein the at least one processor is configured to execute the instructions to:
identify a cause of failure of the at least one transmission path based on content of evaluation of the status of the at least one transmission path; and
output the identified cause of failure.

6. An information processing device comprising:
at least one memory storing instructions; and
at least one processor configured to execute the instructions to:
identify a type of content scheduled to be broadcast or that is being broadcast, by checking a future date and time against content information indicating the type of the content associated with a date and time;
set an acoustic test signal responsive to the type of the content, by checking the identified type of the content against signal information indicating the type of the content associated with the acoustic test signal; and
transmit the set acoustic test signal through at least one transmission path among a plurality of transmission paths.

7. The information processing device according to claim 6, wherein the at least one processor is configured to execute the instructions to transmit the acoustic test signal as has been set responsive to next content scheduled to be broadcast, through the at least one transmission path among the plurality of transmission paths.

8. An information processing system comprising:
at least one memory storing instructions; and
at least one processor configured to execute the instructions to:
set an acoustic test signal responsive to a type of content scheduled to be broadcast or that is being broadcast;
transmit the set acoustic test signal through at least one transmission path among a plurality of transmission paths;
receive the acoustic test signal through the at least one transmission path; and
evaluate a status of the at least one transmission path based on a state of the received acoustic test signal, and based on at least one feature quantity among a feature quantity of a tone pitch of the acoustic test signal, a feature quantity of loudness of the acoustic test signal, and a feature quantity of a tone color of the acoustic test signal.

9. An information processing method comprising:
receiving an acoustic test signal which is set responsive to a type of a content scheduled to be broadcast or that is being broadcast; and
evaluating a status of at least one transmission path based on a state of the received acoustic test signal, and based on at least one feature quantity among a feature quantity of a tone pitch of the acoustic test signal, a feature quantity of loudness of the acoustic test signal, and feature quantity of a tone color of the acoustic test signal.

\* \* \* \* \*